(12) United States Patent

Moe et al.

(10) Patent No.: US 12,600,487 B2

(45) Date of Patent: Apr. 14, 2026

(54) SEGMENTED NACELLE INLET LIP WITH ELECTRIC ANTI-ICING SYSTEM

(71) Applicant: Rohr, Inc., Chula Vista, CA (US)

(72) Inventors: Jeffrey W. Moe, Chula Vista, CA (US); John E. Van Doren, San Diego, CA (US); Aleksandar Ratajac, San Diego, CA (US)

(73) Assignee: Rohr, Inc., Chula Vista, CA (US)

( * ) Notice: Subject to any disclaimer, the term of this patent is extended or adjusted under 35 U.S.C. 154(b) by 0 days.

(21) Appl. No.: 18/231,579

(22) Filed: Aug. 8, 2023

(65) Prior Publication Data

US 2025/0051026 A1 Feb. 13, 2025

(51) Int. Cl.
| | |
|---|---|
| *B64D 33/02* | (2006.01) |
| *B64D 15/12* | (2006.01) |
| *F01D 25/02* | (2006.01) |
| *F02C 7/047* | (2006.01) |

(52) U.S. Cl.
CPC .............. *B64D 33/02* (2013.01); *B64D 15/12* (2013.01); *F01D 25/02* (2013.01); *F02C 7/047* (2013.01); *B64D 2033/0233* (2013.01)

(58) Field of Classification Search
CPC ............ B64D 15/12; B64D 33/02; F02C 7/04
See application file for complete search history.

(56) References Cited

U.S. PATENT DOCUMENTS

| | | | | |
|---|---|---|---|---|
| 4,751,979 A | * | 6/1988 | Wiseman | F02C 7/24 |
| | | | | 181/213 |
| 5,267,828 A | * | 12/1993 | Lenhart | F16B 5/0208 |
| | | | | 415/196 |

| | | | | |
|---|---|---|---|---|
| 5,609,313 A | * | 3/1997 | Cole | B64D 29/00 |
| | | | | 244/54 |
| 7,383,679 B2 | * | 6/2008 | Porte | F01D 21/04 |
| | | | | 415/213.1 |
| 7,469,862 B2 | | 12/2008 | Layland | |

(Continued)

FOREIGN PATENT DOCUMENTS

FR 2836182 B1 10/2005

OTHER PUBLICATIONS

EP Search Report for EP Patent Application No. 24193548.5 dated Nov. 18, 2024.

(Continued)

*Primary Examiner* — Lorne E Meade
(74) *Attorney, Agent, or Firm* — Getz Balich LLC

(57) ABSTRACT

An assembly for an aircraft propulsion system includes a nacelle inlet structure which extends axially along and circumferentially around a centerline. The nacelle inlet structure includes an inlet lip, an inner barrel, an outer barrel and a plurality of structure segments. The inlet lip forms a leading edge of the nacelle inlet structure. The inner barrel projects axially aft away from the inlet lip. The outer barrel projects axially aft away from the inlet lip. The outer barrel is radially outboard of and axially overlaps the inner barrel. Each of the structure segments includes an exterior skin, a mount and an electric heater configured to heat the exterior skin. The exterior skin forms a respective circumferential section of the inlet lip. The mount is connected to the exterior skin. A fastener extends radially through the mount and attaches a respective one of the structure segments to the inner barrel.

18 Claims, 14 Drawing Sheets

(56) References Cited

U.S. PATENT DOCUMENTS

| | | | |
|---|---|---|---|
| 7,513,458 B2 | 4/2009 | Layland | |
| 7,923,668 B2 | 4/2011 | Layland | |
| 8,197,191 B2 * | 6/2012 | Binks | B64D 29/08 |
| | | | 415/214.1 |
| 8,540,185 B2 * | 9/2013 | Vauchel | F02C 7/047 |
| | | | 244/53 B |
| 8,740,137 B2 | 6/2014 | Vauchel | |
| 9,102,413 B2 | 8/2015 | Porte | |
| 9,403,599 B2 | 8/2016 | Binks | |
| 9,567,905 B2 | 2/2017 | Porte | |
| 10,160,552 B2 | 12/2018 | Crawford | |
| 11,008,109 B2 | 5/2021 | Khuong | |
| 11,414,203 B2 | 8/2022 | Sanz Martinez | |
| 12,296,971 B2 * | 5/2025 | Moe | B64D 33/02 |
| 2005/0006529 A1 | 1/2005 | Moe | |
| 2006/0145001 A1 | 7/2006 | Smith | |
| 2006/0237582 A1 | 10/2006 | Layland | |
| 2009/0134272 A1 | 5/2009 | Vauchel | |
| 2010/0260602 A1 * | 10/2010 | Binks | B64D 33/02 |
| | | | 415/214.1 |
| 2012/0126062 A1 | 5/2012 | Stewart, III | |
| 2016/0377090 A1 | 12/2016 | Brown | |
| 2017/0107905 A1 * | 4/2017 | Brown | B23K 20/126 |
| 2019/0291878 A1 | 9/2019 | Kestler | |
| 2020/0017191 A1 | 1/2020 | Porte | |
| 2020/0290747 A1 | 9/2020 | Delsol | |
| 2022/0041295 A1 | 2/2022 | Ferrier | |
| 2024/0367802 A1 | 11/2024 | Sherman | |

OTHER PUBLICATIONS

EP Search Report for EP Patent Application No. 24193683.0 dated Nov. 12, 2024.

EP Search Report for EP Patent Application No. 24193602.0 dated Nov. 27, 2024.

EP Search Report for EP Patent Application No. 24193695.4 dated Feb. 5, 2025.

* cited by examiner

SEGMENTED NACELLE INLET LIP WITH ELECTRIC ANTI-ICING SYSTEM

BACKGROUND

1. Technical Field

This disclosure relates generally to an aircraft propulsion system and, more particularly, to a nacelle inlet structure with, for example, an electric anti-icing system.

2. Background Information

A nacelle for an aircraft propulsion system may include an electric anti-icing system for reducing/preventing ice accumulation on an inlet lip of the nacelle. Various types and configurations of anti-icing systems as well as inlet lips are known in the art. While these known anti-icing systems and inlet lips have various benefit, there is still room in the art for improvement.

SUMMARY OF THE DISCLOSURE

According to an aspect of the present disclosure, an assembly is provided for an aircraft propulsion system. This assembly includes a nacelle inlet structure which extends axially along and circumferentially around a centerline. The nacelle inlet structure includes an inlet lip, an inner barrel, an outer barrel and a plurality of structure segments. The inlet lip forms a leading edge of the nacelle inlet structure. The inner barrel projects axially aft away from the inlet lip. The outer barrel projects axially aft away from the inlet lip. The outer barrel is radially outboard of and axially overlaps the inner barrel. Each of the structure segments includes an exterior skin, a mount and an electric heater configured to heat the exterior skin. The exterior skin forms a respective circumferential section of the inlet lip. The mount is connected to the exterior skin. A fastener extends radially through the mount and attaches a respective one of the structure segments to the inner barrel.

According to another aspect of the present disclosure, another assembly is provided for an aircraft propulsion system. This assembly includes a nacelle inlet structure which extends axially along and circumferentially around a centerline. The nacelle inlet structure includes an inlet lip, an inner barrel, an outer barrel, a first bulkhead and a plurality of structure segments. The inlet lip includes an inner lip portion and an outer lip portion that intersects the inner lip portion at a leading edge of the nacelle inlet structure. The inner barrel projects axially aft away from the inner lip portion. The outer barrel projects axially aft away from the outer lip portion. Each of the structure segments includes an exterior skin and an electric heater configured to heat the exterior skin. The exterior skin forms a respective circumferential section of the inner lip portion that is mechanically attached to the inner barrel. The exterior skin forms a respective circumferential section of the outer lip portion that is bonded to the first bulkhead.

According to still another aspect of the present disclosure, another assembly is provided for an aircraft propulsion system. This assembly includes a nacelle inlet structure which extends axially along and circumferentially around a centerline. The nacelle inlet structure includes an inlet lip, an inner barrel, an outer barrel, a first bulkhead and a plurality of structure segments. The inlet lip includes an inner lip portion and an outer lip portion that intersects the inner lip portion at a leading edge of the nacelle inlet structure. The inner barrel projects axially aft away from the inner lip portion. The outer barrel projects axially aft away from the outer lip portion. Each of the structure segments includes an exterior skin and an electric heater configured to heat the exterior skin. The exterior skin forms a respective circumferential section of the inner lip portion that is mechanically attached to the inner barrel. The exterior skin forms a respective circumferential section of the outer lip portion. A fastener extends radially through the outer barrel, the exterior skin and the first bulkhead.

The structure segments may be arranged circumferentially side-by-side around the centerline in an array to collectively form the inlet lip.

The inner barrel may project axially aft away from an inner lip portion of the inlet lip. The outer barrel may project axially aft away from an outer lip portion of the inlet lip. The mount may be radially outboard of and connected to the inner lip portion of the inlet lip.

The assembly may also include a bulkhead extending radially between and connected to the mount and a respective circumferential section of the outer lip portion formed by the exterior skin.

The fastener may project radially inward and partially into a core of the inner barrel.

The fastener may extend radially through a mount connected to and project axially forward away from a core of the inner barrel.

The mount may include an inner flange, an outer flange and a web connected to and extending radially between the inner flange and the outer flange. The inner flange may be bonded to the exterior skin. The fastener may extend radially through the outer flange.

The inner flange may project axially forward out from the web. The outer flange may project axially aft out from the web and axially overlap the inner barrel.

The mount may include a channel. The channel may project axially into the mount to the web. The channel may extend radially within the mount between the inner flange and the outer flange.

The assembly may also include a seal element axially between and engaged with the mount and the inner barrel.

The assembly may also include a first bulkhead extending between a first bulkhead inner end and a first bulkhead outer end. The first bulkhead may be connected to the inner barrel at the first bulkhead inner end. The first bulkhead may be connected to the exterior skin at the first bulkhead outer end.

A second fastener may extend radially through the exterior skin and the first bulkhead.

The first bulkhead may be bonded to the exterior skin at the first bulkhead outer end.

The assembly may also include a second bulkhead extending between a second bulkhead inner end and a second bulkhead outer end. The second bulkhead may be connected to the inner barrel at the second bulkhead inner end. The second bulkhead may be connected to a respective circumferential section of the outer barrel formed by the exterior skin at the second bulkhead outer end.

A second fastener may extend radially through the exterior skin and the second bulkhead.

The outer barrel may be discrete from the exterior skin and mechanically fastened to the first bulkhead at the first bulkhead outer end.

A second fastener may extend radially through the exterior skin, the outer barrel and the first bulkhead.

The assembly may also include a fan cowl axially overlapping and radially engaging the first bulkhead.

The nacelle inlet structure may also include a second bulkhead connected to the inner barrel. The fan cowl may axially overlap and radially engage the second bulkhead.

The exterior skin may be configured from or otherwise include metal.

The exterior skin may be configured from or otherwise include fiber-reinforced composite material.

The electric heater may be connected to the exterior skin along an interior surface of the exterior skin.

The electric heater may be integrated with the exterior skin.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
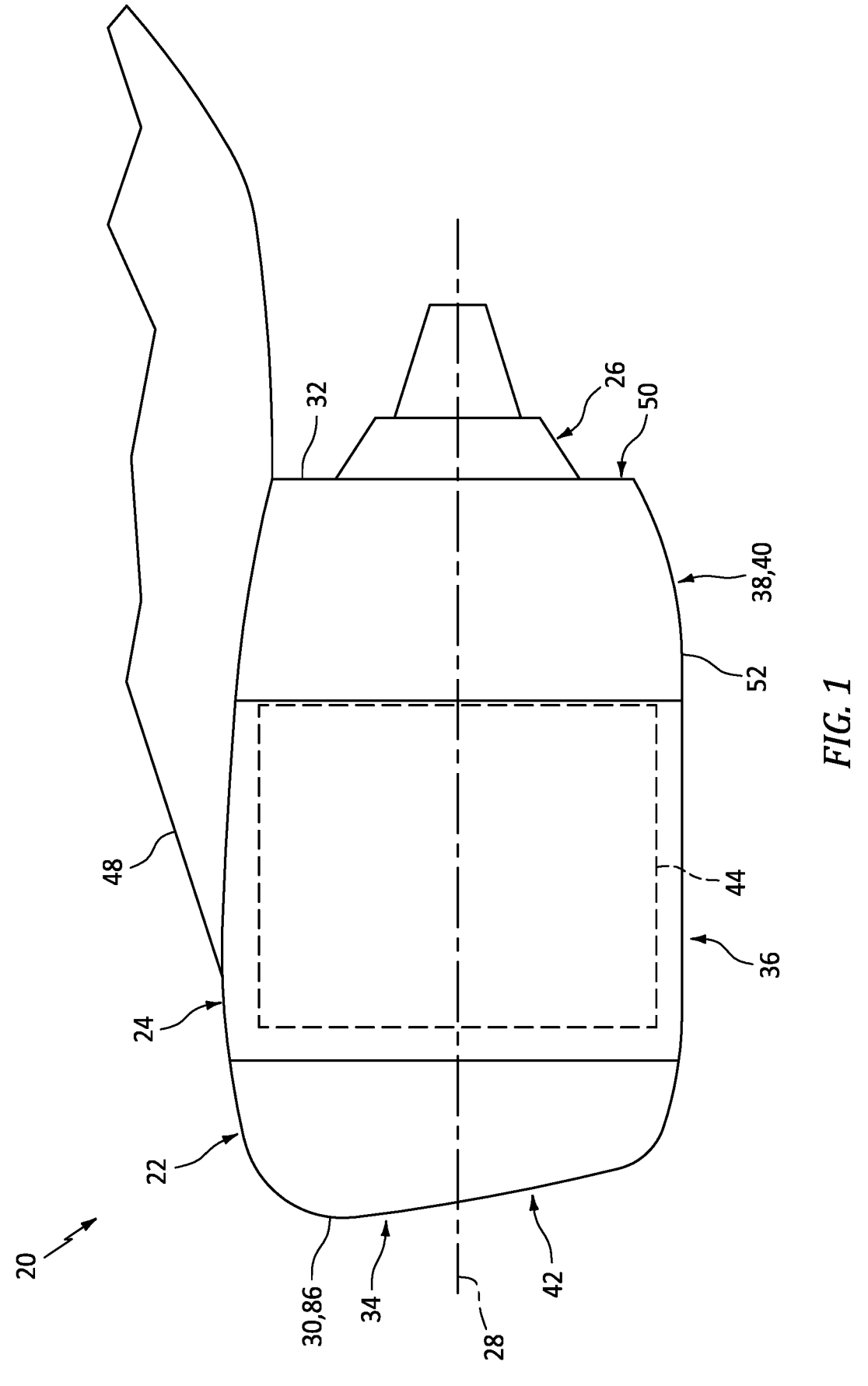
FIG. 1 is a side illustration of an aircraft propulsion system with a pylon.

FIG. 1 illustrates an aircraft propulsion system 20 for an aircraft such as, but not limited to, a commercial airliner or a cargo plane. The aircraft propulsion system 20 includes a nacelle 22 and a gas turbine engine. This gas turbine engine may be configured as a high-bypass turbofan engine. Alternatively, the gas turbine engine may be configured as a turbojet engine or any other type of gas turbine engine capable of propelling the aircraft during flight.

The nacelle 22 is configured to house and provide an aerodynamic cover for the gas turbine engine. The nacelle 22 of FIG. 1, for example, includes a nacelle outer structure 24 and a nacelle inner structure 26; e.g., an inner fixed structure (IFS).

The outer structure 24 extends axially along an axial centerline 28 between an upstream, forward end 30 of the nacelle 22 and its outer structure 24 and a downstream, aft end 32 of the outer structure 24. Briefly, the axial centerline 28 may be a centerline axis of the nacelle 22 and/or the gas turbine engine, and/or a rotational axis for one or more rotating components (e.g., spools) of the gas turbine engine. The outer structure 24 of FIG. 1 includes a nacelle inlet structure 34, one or more nacelle fan cowls 36 (one cowl visible in FIG. 1) and a nacelle aft structure 38, which nacelle aft structure 38 may be configured as part of or include a thrust reverser system 40. The aircraft propulsion system 20, however, may be configured without the thrust reverser system 40 in other embodiments.

The inlet structure 34 is disposed at the nacelle forward end 30. The inlet structure 34 is configured to direct a stream of air through an inlet opening 42 (see also FIG. 2) at the nacelle forward end 30 into the aircraft propulsion system 20 and towards a fan section of the gas turbine engine.

The fan cowls 36 are disposed axially between the inlet structure 34 and the aft structure 38. Each fan cowl 36 of FIG. 1, in particular, is disposed at an aft end of a stationary portion of the nacelle 22, and each fan cowl 36 extends forward to the inlet structure 34. Each fan cowl 36 is generally axially aligned with the fan section of the gas turbine engine. The fan cowls 36 are configured to provide an aerodynamic covering for a fan case 44, which fan case 44 circumscribes a fan rotor within the fan section and may partially form an outer peripheral boundary of a flowpath 46 (see FIG. 2) of the aircraft propulsion system 20.

The term "stationary portion" is used above to describe a portion of the nacelle 22 that is stationary during propulsion system operation (e.g., during aircraft takeoff, aircraft flight and aircraft landing). However, the stationary portion may be otherwise movable for inspection/maintenance of the aircraft propulsion system 20; e.g., when the aircraft propulsion system 20 is non-operational. Each of the fan cowls 36, for example, may be configured to provide access to components of the gas turbine engine such as the fan case 44 and/or peripheral equipment arranged with the fan case 44 for inspection, maintenance and/or otherwise. In particular, each of the fan cowls 36 may be pivotally mounted with the aircraft propulsion system 20 (e.g., to a pylon structure 48) by, for example, a pivoting hinge system. The present disclosure, however, is not limited to the foregoing fan cowl configurations and/or access schemes.

The aft structure 38 of FIG. 1 is disposed at the structure aft end 32. The aft structure 38 is configured to form a bypass exhaust 50 for a bypass flowpath with the inner structure 26. The aft structure 38 may include one or more translating sleeves 52 (one sleeve visible in FIG. 1) for the thrust reverser system 40. The present disclosure, however, is not limited to such a translating sleeve thrust reverser system.

Figure 2:
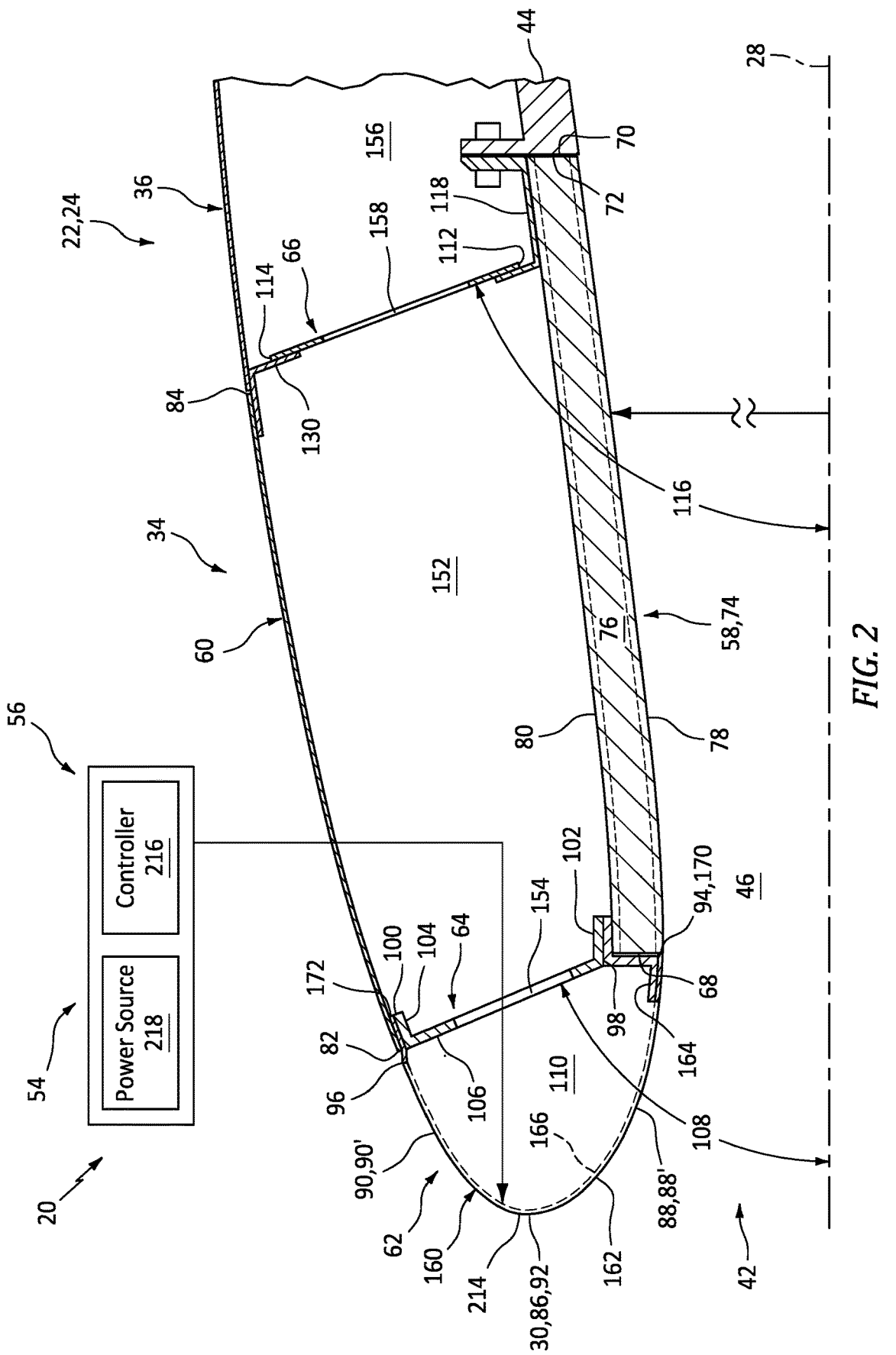
FIG. 2 is a partial sectional illustration of the propulsion system at a nacelle inlet structure with an electric anti-icing system.

FIG. 2 illustrates an assembly 54 for the aircraft propulsion system 20. This propulsion system assembly 54 includes the inlet structure 34, the fan cowls 36 (one cowl visible in FIG. 2) and the fan case 44. The propulsion system assembly 54 also includes an electric anti-icing system 56.

The inlet structure 34 of FIG. 2 includes an inner barrel 58, an outer barrel 60, an inlet lip 62 (e.g., a nose lip), and one or more bulkheads 64 and 66. The inlet structure 34 of FIG. 2 also includes one or more components of the anti-icing system 56.

The inner barrel 58 extends axially along the axial centerline 28 from an upstream, forward end 68 of the inner barrel 58 to a downstream, aft end 70 of the inner barrel 58. The inner barrel 58 extends circumferentially about (e.g., completely around) the axial centerline 28. The inner barrel 58 may thereby have a full-hoop (e.g., tubular) geometry. At (e.g., on, adjacent or proximate) the inner barrel aft end 70, the inner barrel 58 of FIG. 2 is mechanically fastened and/or otherwise attached to the fan case 44 at an upstream, forward end 72 of the fan case 44.

The inner barrel 58 may be configured to attenuate sound (e.g., noise) generated during operation of the aircraft propulsion system 20 and, more particularly for example, sound generated by rotation of the fan rotor within the fan section. The inner barrel 58 of FIG. 2, for example, includes at least one tubular acoustic panel 74 or an array of arcuate acoustic panels 74 arranged circumferentially about the axial centerline 28. Each acoustic panel 74 may include a cellular (e.g., honeycomb) core 76 bonded to and radially between a perforated face sheet 78 and a non-perforated back sheet 80, where the perforated face sheet 78 faces radially inward and forms an outer peripheral boundary for an axial portion of the flowpath 46. Of course, various other acoustic panel types and configurations are known in the art, and the present disclosure is not limited to any particular ones thereof.

The outer barrel 60 extends axially along the axial centerline 28 from an upstream, forward end 82 of the outer barrel 60 to a downstream, aft end 84 of the outer barrel 60. The outer barrel 60 extends circumferentially about (e.g., completely around) the axial centerline 28. The outer barrel 60 may thereby have a full-hoop (e.g., tubular) geometry. The outer barrel 60 is spaced radially outboard of and axially overlaps the inner barrel 58. The outer barrel 60 thereby circumscribes the inner barrel 58. The outer barrel 60 of FIG. 2 is also radially outboard of and axially overlaps at least a portion or an entirety of each of the bulkheads 64 and 66. The outer barrel 60 thereby circumscribes each of the bulkheads 64 and 66. At or near the outer barrel forward end 82, the outer barrel 60 may be (e.g., removably) mechanically attached to and supported by the forward bulkhead 64 as described below in further detail. At or near the outer barrel aft end 84, the outer barrel 60 may be (e.g., removably) mechanically attached to and supported by the aft bulkhead 66 as described below in further detail.

The inlet lip 62 forms a leading edge 86 of the nacelle 22 as well as the inlet opening 42 into the aircraft propulsion system 20 (see FIG. 1), where the leading edge 86 is located at the nacelle forward end 30. The inlet lip 62 has a cupped (e.g., generally U-shaped or V-shaped or J-shaped) cross-sectional geometry which extends circumferentially around the axial centerline 28. The inlet lip 62 includes an inner lip portion 88 and an outer lip portion 90.

The inner lip portion 88 extends longitudinally (e.g., radially inwards towards and/or axially along the axial centerline 28) from an intersection 92 with the outer lip portion 90 at the leading edge 86 to an inner downstream, aft end 94 ("inner aft end") of the inlet lip 62 and its inner lip portion 88. The inner lip portion 88 extends circumferentially about (e.g., completely around) the axial centerline 28. The inner lip portion 88 may thereby have a full-hoop (e.g., annular and/or tubular) geometry. The inlet lip inner aft end 94 is disposed axially adjacent the inner barrel forward end 68. At the inlet lip inner aft end 94, the inlet lip 62 and its inner lip portion 88 may be (e.g., removably) mechanically attached to and supported by the inner barrel 58 and/or the forward bulkhead 64 as described below in further detail.

The outer lip portion 90 extends longitudinally (e.g., radially outwards away from and/or axially along the axial centerline 28) from the intersection 92 with the inner lip portion 88 at the leading edge 86 to an outer downstream, aft end 96 ("outer aft end") of the inlet lip 62 and/or its outer lip portion 90. As the outer lip portion 90 extends longitudinally towards (e.g., to) the inlet lip outer aft end 96, the outer lip portion 90 axially overlaps and diverges radially away from (in a radial outward direction away from the axial centerline 28) the inner lip portion 88. The outer lip portion 90 extends circumferentially about (e.g., completely around) the axial centerline 28. The outer lip portion 90 may thereby have a full-hoop (e.g., tubular) geometry and circumscribe the inner lip portion 88. At the inlet lip outer aft end 96, the inlet lip 62 and its outer lip portion 90 may be (e.g., removably) mechanically attached to the outer barrel 60 and/or the forward bulkhead 64 as described below in further detail. The inlet lip 62 and its outer lip portion 90 may also be supported by the forward bulkhead 64.

The forward bulkhead 64 extends vertically from an inner end 98 of the forward bulkhead 64 to an outer end 100 of the forward bulkhead 64. The forward bulkhead 64 extends circumferentially about (e.g., completely around) the axial centerline 28. The forward bulkhead 64 may thereby have a full-hoop (e.g., annular) geometry.

The forward bulkhead 64 of FIG. 2 includes one or more flanges 102 and 104 and a base 106; e.g., a web. The forward bulkhead inner flange 102 is disposed at the forward bulkhead inner end 98. The forward bulkhead inner flange 102 of FIG. 2 projects axially out from the forward bulkhead base 106 (in an axial aft direction along the axial centerline 28) to an axial distal end of the forward bulkhead inner flange 102. The forward bulkhead outer flange 104 is disposed at the forward bulkhead outer end 100. The forward bulkhead outer flange 104 of FIG. 2 projects axially out from the forward bulkhead base 106 (in the axial aft direction along the axial centerline 28) to an axial distal end of the forward bulkhead outer flange 104. The forward bulkhead base 106 extends radially outwards away from the axial centerline 28 and axially along the axial centerline 28 from the forward bulkhead inner flange 102 to the forward bulkhead outer flange 104. This forward bulkhead base 106 is also connected to (e.g., formed integral with) the forward bulkhead inner flange 102 and the forward bulkhead outer flange 104. With this arrangement, the forward bulkhead 64 of FIG. 2 has a channeled configuration; e.g., a C-shaped configuration. A forward bulkhead channel, for example, projects (e.g., generally axially) into the forward bulkhead 64 to the forward bulkhead base 106. This forward bulkhead channel extend (e.g., generally radially) within the forward bulkhead 64 along the forward bulkhead base 106 and between the forward bulkhead inner flange 102 and the forward bulkhead outer flange 104.

The forward bulkhead 64 and its forward bulkhead base 106 of FIG. 2 have a canted configuration where the forward bulkhead 64 and its forward bulkhead base 106 are angularly offset from the axial centerline 28 by a forward bulkhead offset angle 108. This forward bulkhead offset angle 108 may be a non-zero acute angle which is less than ninety degrees (90°) and equal to or greater than forty-five degrees (45°); e.g., between fifty degrees (50°) and seventy degrees (70°). The forward bulkhead base 106 of FIG. 2, for example, has a frustoconical geometry which radially tapers inward as the forward bulkhead 64 extends axially (in the axial aft direction along the axial centerline 28) from (or about) the forward bulkhead outer end 100 to (or about) the forward bulkhead inner end 98. The present disclosure, however, is not limited to such an exemplary arrangement. The forward bulkhead 64, for example, may alternatively be arranged perpendicular to the axial centerline 28 in other embodiments. In addition or alternatively, the forward bulkhead 64 may have a non-channel configuration; e.g., a Z-shaped configuration.

The forward bulkhead inner flange 102 may be (e.g., removably) mechanically attached to the inner lip portion 88 and/or the inner barrel 58 at the forward bulkhead inner end 98 as described below in further detail. The forward bulkhead outer flange 104 may be (e.g., removably) mechanically attached to the outer lip portion 90 and/or the outer barrel 60 at the forward bulkhead outer end 100 as described below in further detail. With this arrangement, the inlet structure 34 includes a forward internal cavity 110 ("forward cavity"). This forward cavity 110 extends radially within the inlet lip 62 from the inner lip portion 88 to the outer lip portion 90. The forward cavity 110 extends axially along the axial centerline 28 between the inlet lip 62 and the forward bulkhead 64. More particularly, the forward cavity 110 extends axially from a forward side of the forward bulkhead 64 to the inner lip portion 88 and the outer lip portion 90 at the intersection 92 between those lip portions 88 and 90. The forward cavity 110 extends circumferentially about (e.g., completely around) the axial centerline 28. The forward cavity 110 may thereby have a full-hoop (e.g., annular) geometry within the inlet structure 34.

The aft bulkhead 66 extends vertically from an inner end 112 of the aft bulkhead 66 to an outer end 114 of the aft bulkhead 66. The aft bulkhead 66 extends circumferentially about (e.g., completely around) the axial centerline 28. The aft bulkhead 66 may thereby have a full-hoop (e.g., annular) geometry. The aft bulkhead 66 of FIG. 2 projects radially outwards away from the axial centerline 28 and axially along the axial centerline 28 from the aft bulkhead inner end 112 to the aft bulkhead outer end 114.

The aft bulkhead 66 has a canted configuration where the aft bulkhead 66 is angularly offset from the axial centerline 28 by an aft bulkhead offset angle 116. This aft bulkhead offset angle 116 may be a non-zero acute angle which is less than ninety degrees (90°) and equal to or greater than seventy degrees (70°). The aft bulkhead 66 of FIG. 2, for example, has a frustoconical geometry which radially tapers inward as the aft bulkhead 66 extends axially (in the axial aft direction along the axial centerline 28) from (or about) the aft bulkhead outer end 114 to (or about) the aft bulkhead inner end 112. The present disclosure, however, is not limited to such an exemplary arrangement. The aft bulkhead 66, for example, may alternatively be arranged perpendicular to the axial centerline 28 in other embodiments.

Figure 3:
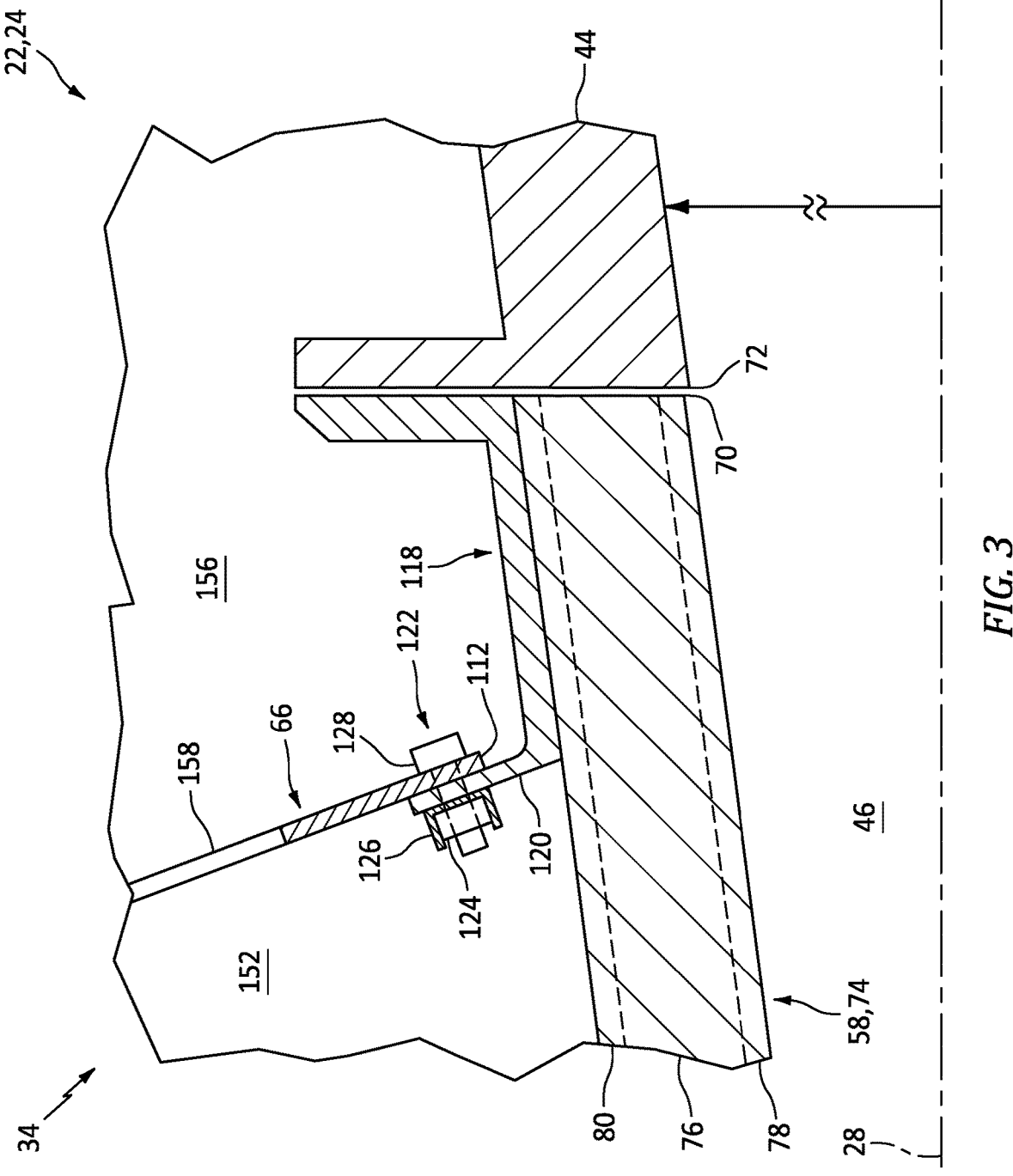
FIG. 3 is a partial sectional illustration of a fastening arrangement between an inner barrel, a fan case and an aft bulkhead.

Referring to FIG. 3, at the aft bulkhead inner end 112, the aft bulkhead 66 is attached to the inner barrel 58 through, for example, an inner mounting structure 118; e.g., an attach ring. The aft bulkhead 66 of FIG. 3, for example, is removably attached to a forward flange 120 of the inner mounting structure 118 by one or more fasteners 122 (one visible in FIG. 3); e.g., bolts. Each fastener 122 of FIG. 3 is mated with and projects (e.g., axially) through a respective fastener aperture in the aft bulkhead 66 and a respective fastener aperture in the forward flange 120. Here, each fastener 122 is threaded into a nut 124 of a nut plate 126 attached to a forward side of the forward flange 120. The aft bulkhead 66 and the forward flange 120 may thereby be secured (e.g., clamped) axially between the respective nut 124 and a head 128 of the respective fastener 122. In addition, the inner mounting structure 118 may also facilitate attachment of the fan case 44 to the inner barrel 58. The present disclosure, however, is not limited to such an exemplary arrangement. The aft bulkhead 66, for example, may alternatively be bonded to or formed integral with the inner mounting structure 118.

Figure 4:
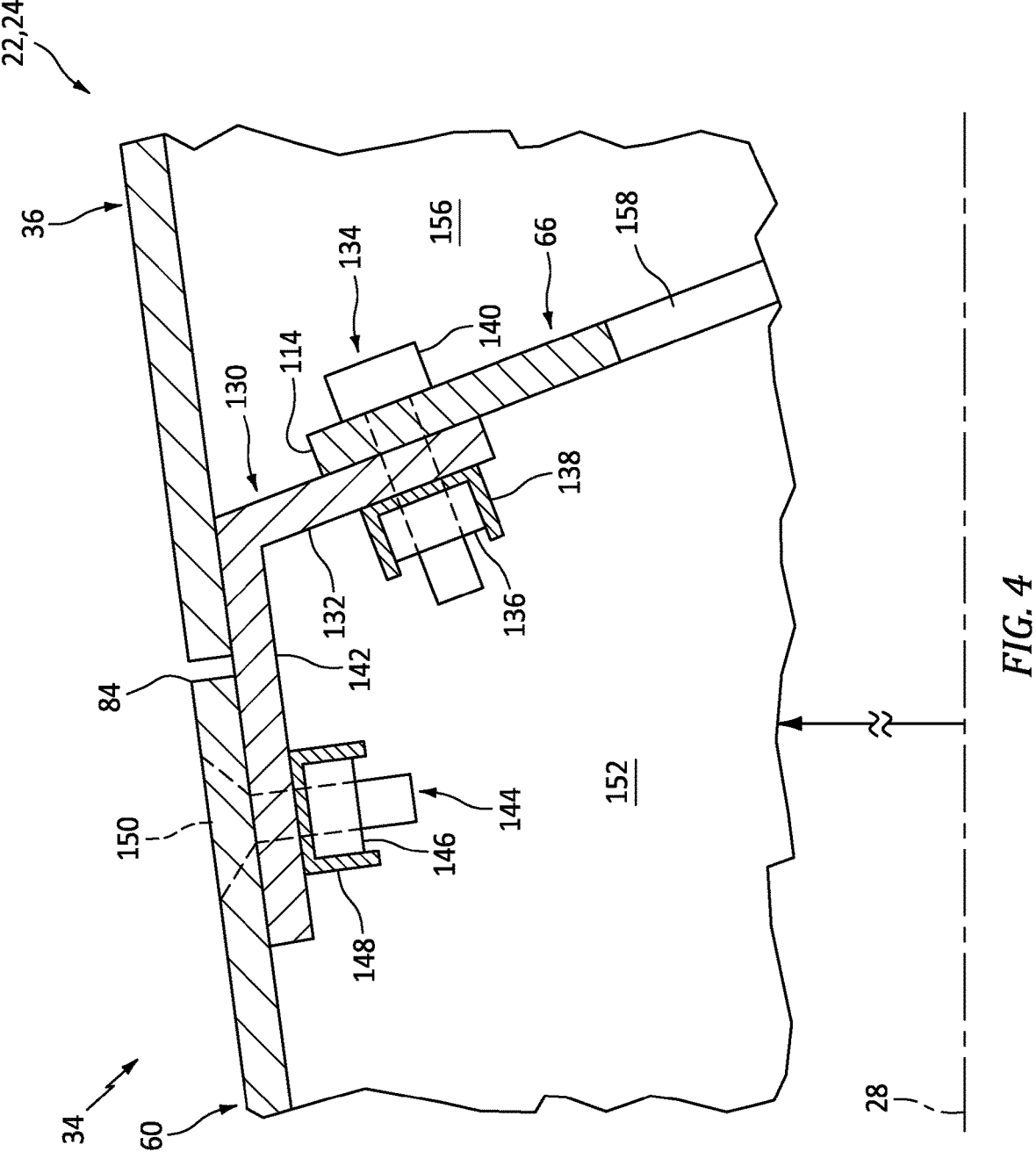
FIG. 4 is a partial sectional illustration of an arrangement between an outer barrel, a fan cowl and the aft bulkhead.

Referring to FIG. 4, at the aft bulkhead outer end 114, the aft bulkhead 66 is attached to the outer barrel 60 through, for example, an outer mounting structure 130; e.g., an attach ring. The aft bulkhead 66 of FIG. 4, for example, is removably attached to an aft flange 132 of the outer mounting structure 130 by one or more fasteners 134 (one visible in FIG. 4); e.g., bolts. Each fastener 134 of FIG. 4 is mated with and projects (e.g., axially) through a respective fastener aperture in the aft bulkhead 66 and a respective fastener aperture in the aft flange 132. Here, each fastener 134 is threaded into a nut 136 of a nut plate 138 attached to a forward side of the aft flange 132. The aft bulkhead 66 and the aft flange 132 may thereby be secured (e.g., clamped) axially between the respective nut 136 and a head 140 of the respective fastener 134. The outer barrel 60 may similarly be removably attached to an outer flange 142 of the outer mounting structure 130 by one or more fasteners 144 (one visible in FIG. 4); e.g., bolts. Each fastener 144 of FIG. 4 is mated with and projects (e.g., radially) through a respective fastener aperture in the outer barrel 60 and a respective fastener aperture in the outer flange 142. Here, each fastener 144 is threaded into a nut 146 of a nut plate 148 attached to an inner side of the outer flange 142. The outer barrel 60 and the outer flange 142 may thereby be secured (e.g., clamped) radially between the respective nut 146 and a head 150 of the respective fastener 144. The present disclosure, however, is not limited to such an exemplary arrangement. The aft bulkhead 66 or the outer barrel 60, for example, may alternatively be bonded to or formed integral with the outer mounting structure 130.

Referring to FIG. 2, with the foregoing arrangement, the inlet structure 34 includes an aft internal cavity 152 ("aft cavity"). This aft cavity 152 extends radially within the inlet structure 34 from the inner barrel 58 to the outer barrel 60. The aft cavity 152 extends axially along the axial centerline 28 from the forward bulkhead 64 to the aft bulkhead 66. The aft cavity 152 extends circumferentially about (e.g., completely around) the axial centerline 28. The aft cavity 152 may thereby have a full-hoop (e.g., annular) geometry within the inlet structure 34.

The aft cavity 152 may (or may not) be fluidly coupled with the forward cavity 110 through one or more ports 154 (e.g., access windows, etc.) in the forward bulkhead 64 and its forward bulkhead base 106. The aft cavity 152 may (or may not) also or alternatively be fluidly coupled with an internal compartment 156 between the fan case 44 (see FIG. 2) and each fan cowl 36 through one or more ports 158 (e.g., access windows, etc.) in the aft bulkhead 66.

Figure 5:
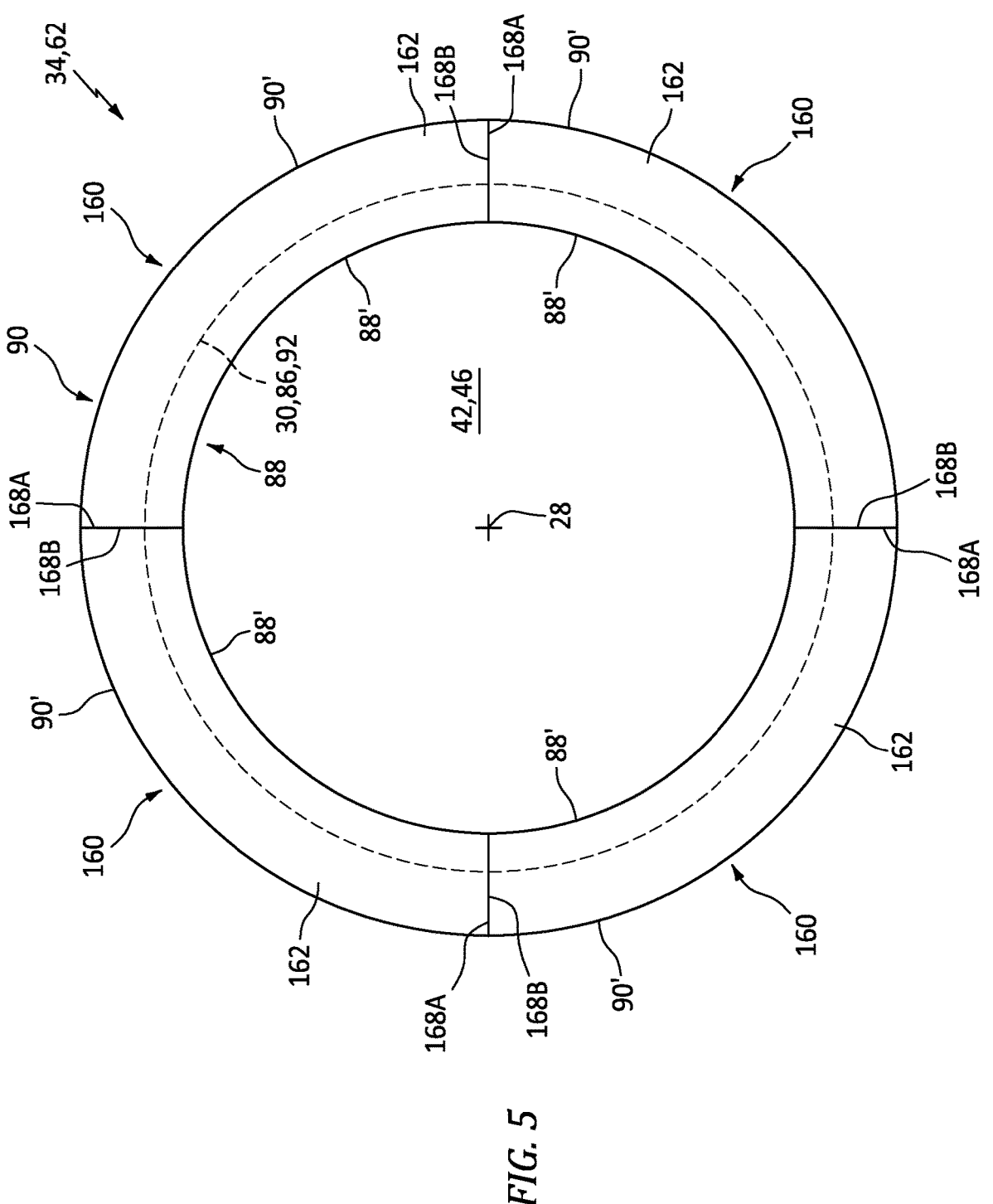
FIG. 5 is an end view illustration of a segmented inlet lip.

Referring to FIG. 5, the inlet structure 34 includes a plurality of discrete circumferential inlet structure segments 160. These structure segments 160 are arranged circumferentially side-by-side around the axial centerline 28 in an array to collectively form one or more members of the inlet structure 34; e.g., the inlet lip 62 and its inner and outer lip portions 88 and 90 (see FIG. 2). Note, while the inlet structure 34 is shown with four (4) of the structure segments 160 in FIG. 5, the inlet structure 34 may alternatively include less than or more than four (4) of the structure segments 160 in other embodiments; e.g., two (2) or three (3) of the structure segments 160, five (5) or six (6) of the structure segments 160, etc. Referring to FIG. 2, one or more or all of the structure segments 160 each include a segment exterior skin 162, a segment mount 164 and an electric heater 166.

The exterior skin 162 may be configured as a relatively thin sheet or layer of continuous and uninterrupted material; e.g., non-perforated material. This exterior skin material may be constructed from metal; e.g., sheet metal. Examples of the metal include, but are not limited to, aluminum (Al)

or an aluminum alloy, and titanium (Ti) and a titanium alloy. Alternatively, the exterior skin material may be constructed from a composite material; e.g., fiber-reinforced composite material. The exterior skin material, for example, may include a polymer (e.g., thermoplastic or thermoset) matrix and fiber-reinforcement (e.g., carbon fibers, fiberglass fibers, aramid fibers, etc.) embedded within the polymer matrix.

The exterior skin 162 may form a (e.g., entire) circumferential section of the inlet lip 62 and its inner lip portion 88 and its outer lip portion 90. Each exterior skin 162 of FIG. 5, for example, extends circumferentially about the axial centerline 28 between and to opposing circumferential sides 168A and 168B (generally referred to as "168") of the respective structure segment 160. The exterior skin 162 of FIG. 2 extends longitudinally from a longitudinal inner end 170 of the exterior skin 162 to a longitudinal outer end 172 of the exterior skin 162. The skin inner end 170 may be located at and/or form a circumferential section of the inlet lip inner aft end 94. The skin outer end 172 (or a portion of the exterior skin 162 nearby) may be located at and/or form a circumferential section of the inlet lip outer aft end 96. Here, the skin inner end 170 is disposed axially aft of the skin outer end 172 along the axial centerline 28. With this arrangement, the exterior skin 162 includes an inner lip section 88' and an outer lip section 90'. The inner lip section 88' forms a (e.g., entire) respective circumferential section of the inner lip portion 88 of the inlet lip 62. The outer lip section 90' forms a (e.g., entire) respective circumferential section of the outer lip portion 90 of the inlet lip 62.

Figure 6:
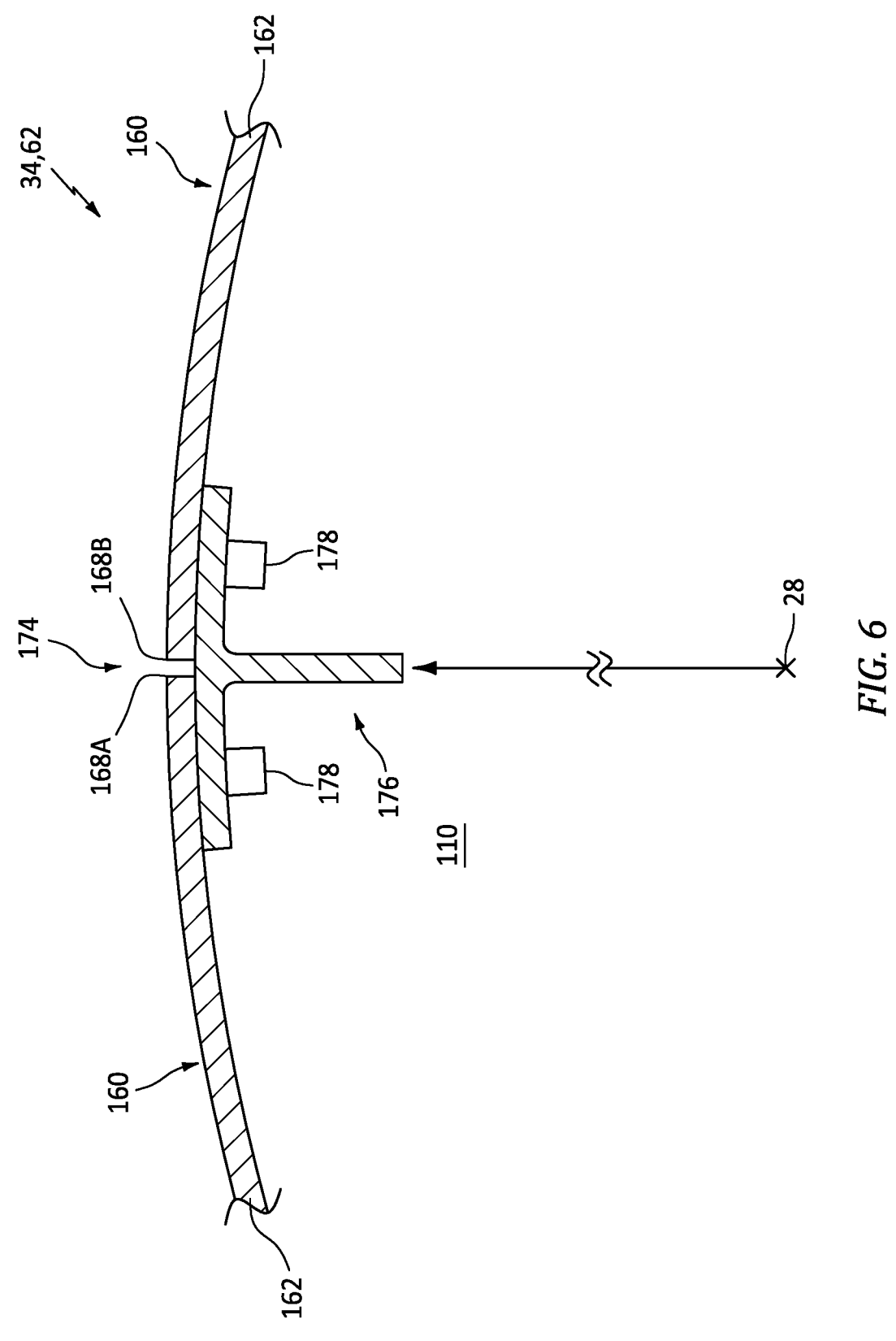
FIG. 6 is a partial cross-sectional illustration of the inlet lip at an interface between neighboring circumferential segments.

Referring to FIG. 6, at each segment side 168, each exterior skin 162 is disposed circumferentially next to a circumferentially neighboring (e.g., adjacent) exterior skin 162 at an inter-skin interface 174; e.g., a seam. At this inter-skin interface 174, the respective exterior skins 162 may be circumferentially engaged with (e.g., contact one another, abut against one another) or may be slightly circumferentially spaced from one another. Also at the inter-skin interface 174, the respective exterior skins 162 may be attached to one another through an axially extending inter-skin coupler 176. More particularly, each exterior skin 162 may be (e.g., removably) mechanically attached to the respective inter-skin coupler 176 by, for example, one or more fasteners 178; e.g., bolts, rivets, etc. Each fastener 178, for example, may project (e.g., radially) through the respective exterior skin 162 and a respective flange of the inter-skin coupler 176.

Figure 7:
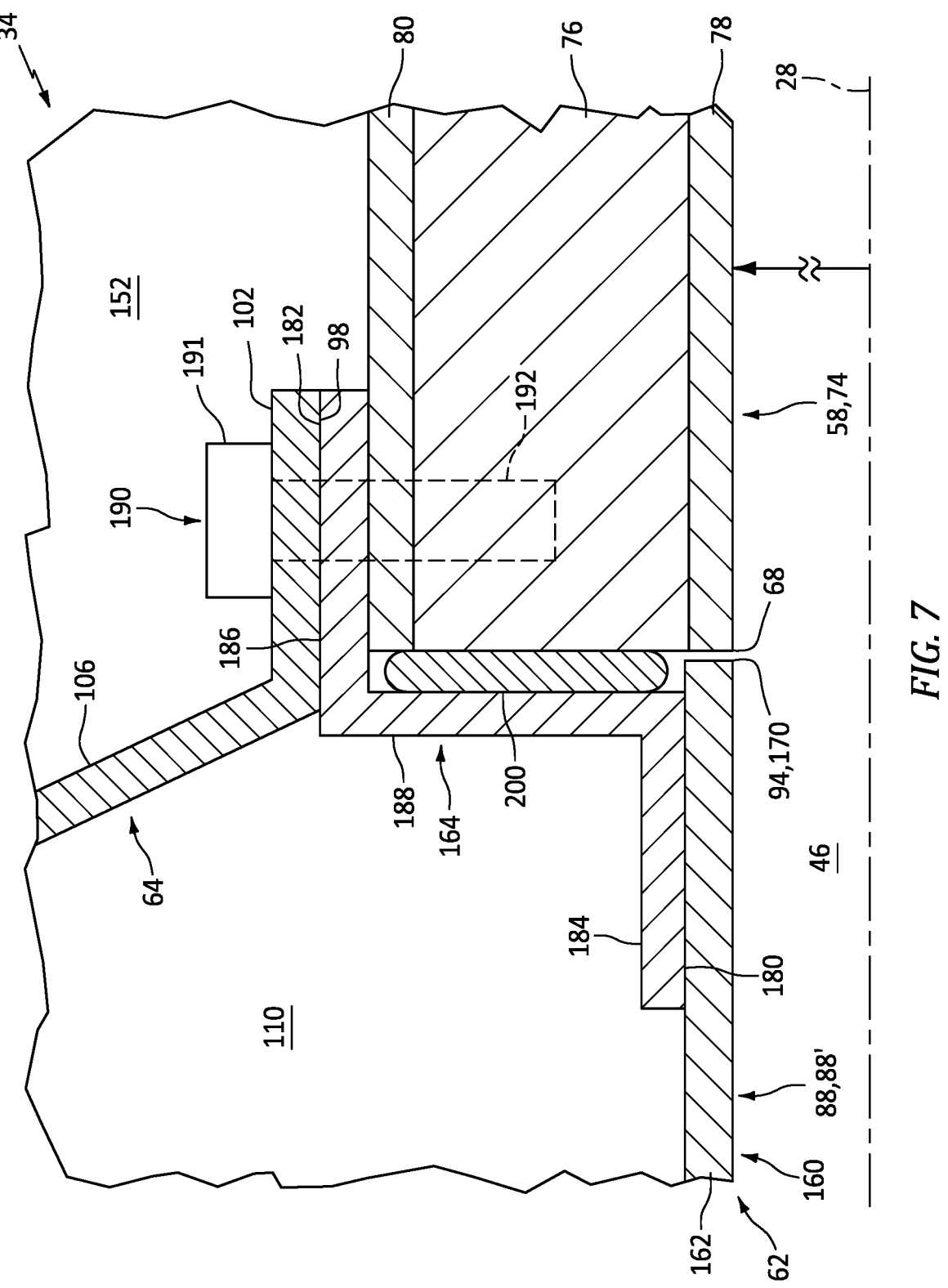
FIGS. 7 and 8 are partial sectional illustrations of various fastening arrangements between the inner barrel, the inlet lip and a forward bulkhead.

Referring to FIG. 7, the segment mount 164 extends vertically from an inner end 180 of the segment mount 164 to an outer end 182 of the segment mount 164. The segment mount 164 of FIG. 7 includes one or more flanges 184 and 186 and a base 188; e.g., a web. The mount inner flange 184 is disposed at the mount inner end 180. The mount inner flange 184 of FIG. 7 projects axially out from the mount base 188 (in an axial forward direction along the axial centerline 28) to an axial distal end of the mount inner flange 184. The mount outer flange 186 is disposed at the mount outer end 182. The mount outer flange 186 of FIG. 7 projects axially out from the mount base 188 (in the axial aft direction along the axial centerline 28) to an axial distal end of the mount outer flange 186. The mount base 188 extends radially outwards away from the axial centerline 28 from the mount inner flange 184 to the mount outer flange 186. This mount base 188 is also connected to (e.g., formed integral with) the mount inner flange 184 and the mount outer flange 186. With this arrangement, the segment mount 164 of FIG. 7 may have a Z-shaped configuration.

The segment mount 164 is disposed within/along the forward cavity 110 and/or the aft cavity 152. This segment mount 164 is configured to (e.g., removably) mechanically attach the respective structure segment 160 and its exterior skin 162 to the inner barrel 58 and/or the forward bulkhead 64. The mount inner flange 184 of FIG. 7, for example, axially overlaps the respective exterior skin 162 along the inner lip section 88'. This mount inner flange 184 is bonded to (e.g., welded to, adhered to, consolidated with, etc.) the respective exterior skin 162 at the skin inner end 170. The mount outer flange 186 of FIG. 7 axially overlaps the inner barrel 58 and its members 76, 78 and 80. This mount outer flange 186 is (e.g., removably) mechanically attached to the inner barrel 58 and/or the forward bulkhead 64 by one or more fasteners 190 (one visible in FIG. 7); e.g., bolts. More particularly, the mount outer flange 186 of FIG. 7 is arranged radially between the inner barrel 58 and its members 76, 78 and 80 and the forward mount inner flange 184. A head 191 of each fastener 190 may be abutted radially against an outer side of the forward bulkhead inner flange 102. A shank 192 of each fastener 190 my projects radially (in a radial inward direction towards the axial centerline 28) out from the fastener head 191, through a respective fastener aperture in the forward bulkhead inner flange 102, a respective fastener aperture in the mount outer flange 186 and partially into the inner barrel 58; e.g., through the inner barrel back sheet 80 and partially into the inner barrel core 76. The mount outer flange 186 may thereby be secured (e.g., clamped) radially between the forward bulkhead inner flange 102 and the inner barrel 58.

Figure 8:
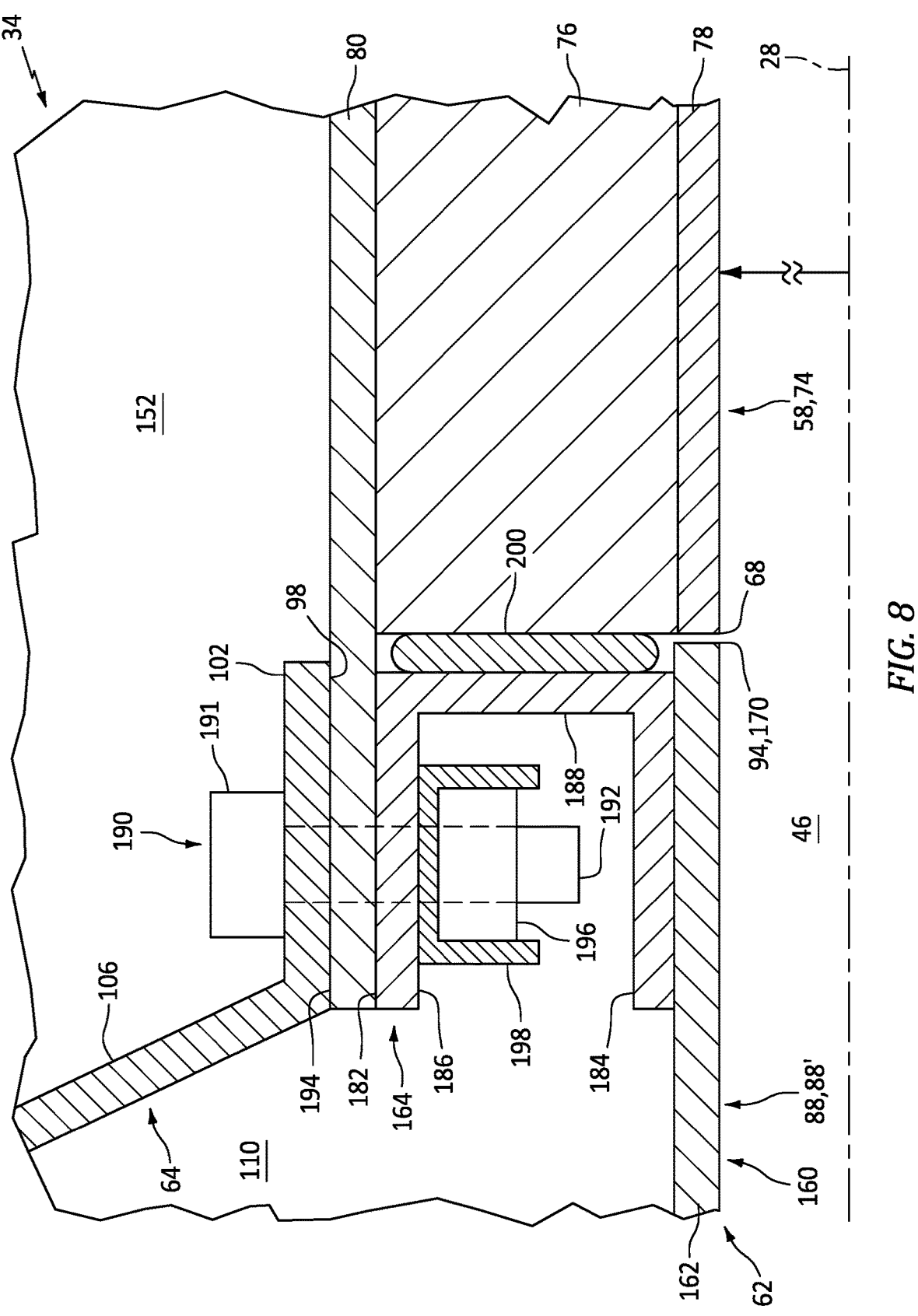

While the segment mount 164 is described above with the Z-shaped configuration, the present disclosure is not limited to such an exemplary arrangement. For example, referring to FIG. 8, the segment mount 164 may alternatively have a channeled configuration; e.g., a C-shaped configuration. The mount outer flange 186 of FIG. 8, for example, projects axially out from the mount base 188 (in the axial forward direction along the axial centerline 28/away from the inner barrel core 76) to an axial distal end of the mount outer flange 186. With this arrangement, a mount 194 for the inner barrel 58 (e.g., a flange, an extension of the inner barrel back sheet 80, etc.) may be secured (e.g., clamped) radially between the mount outer flange 186 and the forward bulkhead inner flange 102. Here, each fastener 190 is threaded into a nut 196 of a nut plate 198 attached to an inner side of the mount outer flange 186. This nut plate 198 of FIG. 8 is disposed within a channel of the segment mount 164. This mount channel projects (e.g., generally axially) into the segment mount 164 to the mount base 188. This mount channel extend (e.g., generally radially) within the segment mount 164 along the mount base 188 and between the mount inner flange 184 and the mount outer flange 186.

In some embodiments, referring to FIGS. 7 and 8, a seal element 200 may be included to seal a gap between the inner barrel 58 and the inlet lip 62. The seal element 200 of FIGS. 7 and 8, for example, is disposed axially between and engaged with each mount base 188 and the inner barrel 58.

Figure 9:
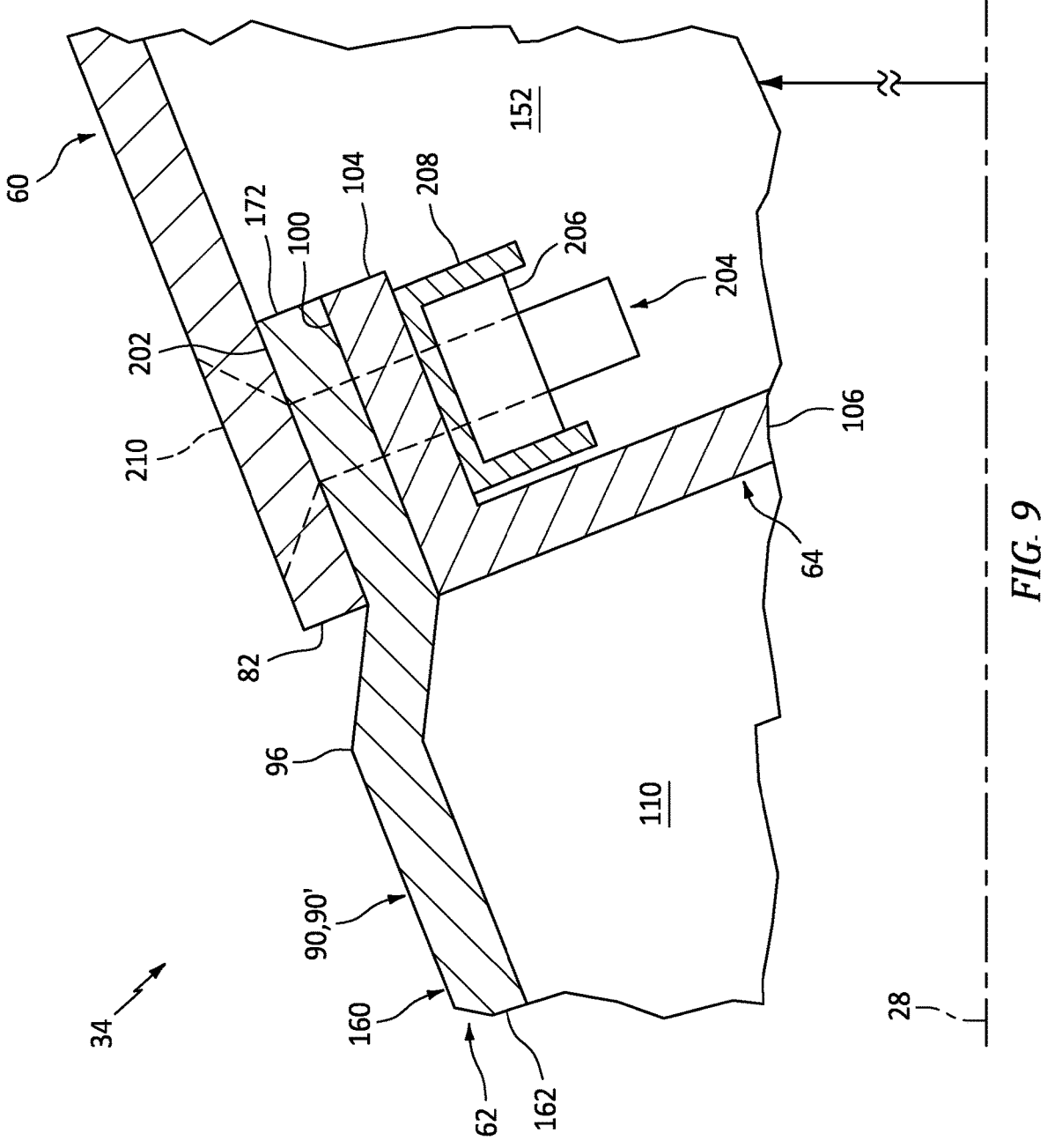
FIGS. 9-11 are partial sectional illustrations of various fastening arrangements between the outer barrel, the inlet lip and the forward bulkhead.

Referring to FIG. 9, the exterior skin 162 may form an outer mount 202 for the structure segment 160 at its skin outer end 172. This outer mount 202 may be (e.g., slightly) recessed/stepped inward from the longitudinally adjacent outer lip section 90'. The outer mount 202 of FIG. 9 is arranged radially between the outer barrel 60 at its outer barrel forward end 82 and the forward bulkhead outer flange 104. Each exterior skin 162 and the outer barrel 60 may be (e.g., removably) mechanically attached to one another and the forward bulkhead 64 by one or more fasteners 204 (one visible in FIG. 9); e.g., bolts. Each fastener 204 of FIG. 9 is mated with and projects (e.g., radially) through a respective fastener aperture in the outer barrel 60, a respective fastener aperture in the outer mount 202, and a respective fastener aperture in the forward bulkhead outer flange 104. Here, each fastener 204 is threaded into a nut 206 of a nut plate 208 attached to an inner side of the forward bulkhead outer flange 104. A stack of the outer barrel 60, the outer mount 202 and the forward bulkhead outer flange 104 may thereby be secured (e.g., clamped) radially between the respective nut 206 and a head 210 of the respective fastener 204. The present disclosure, however, is not limited to such an exemplary arrangement. The outer barrel 60, for example, may alternatively be arranged and secured radially between each exterior skin 162 and the forward bulkhead outer flange 104.

Figure 10:
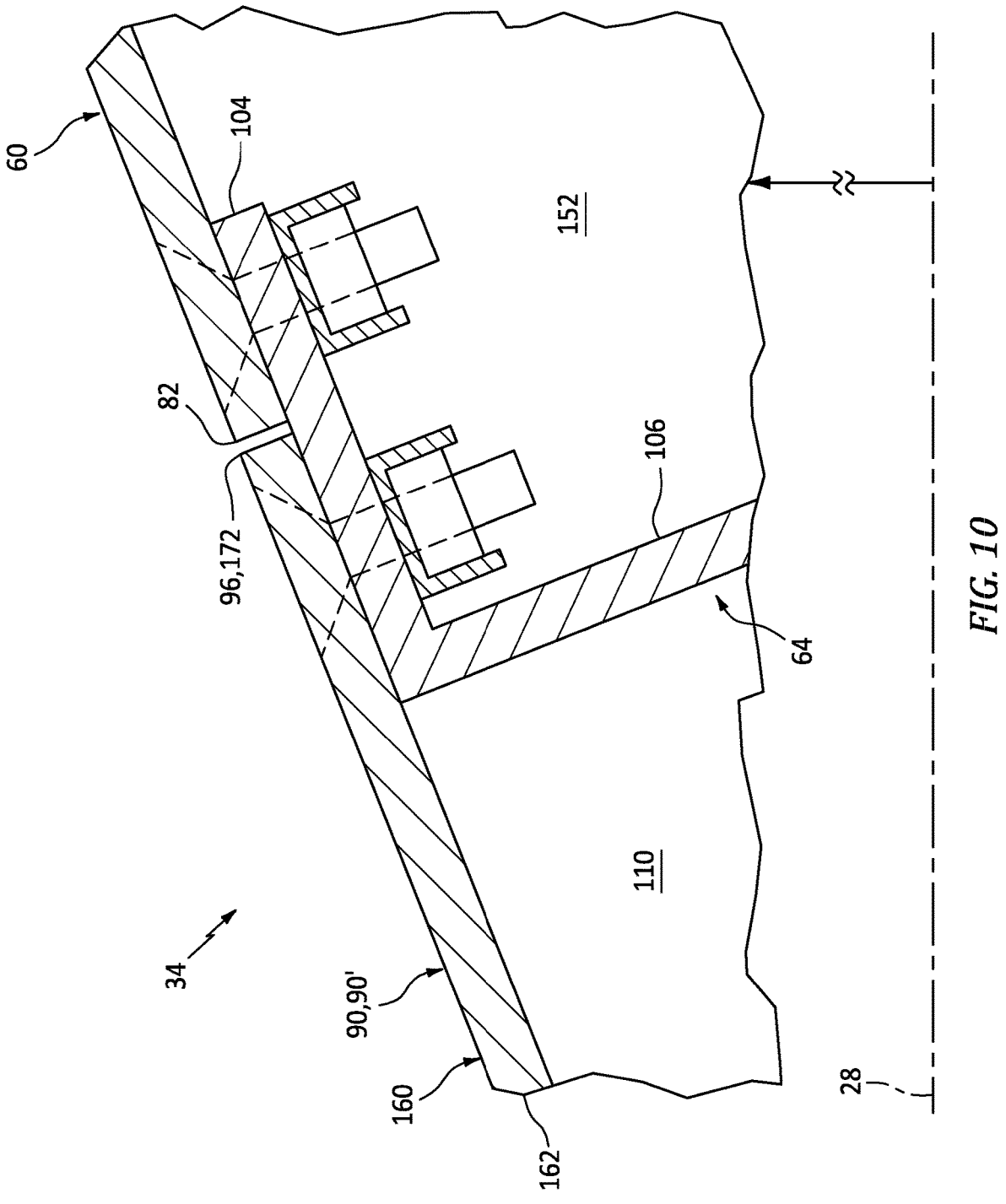
Figure 11:
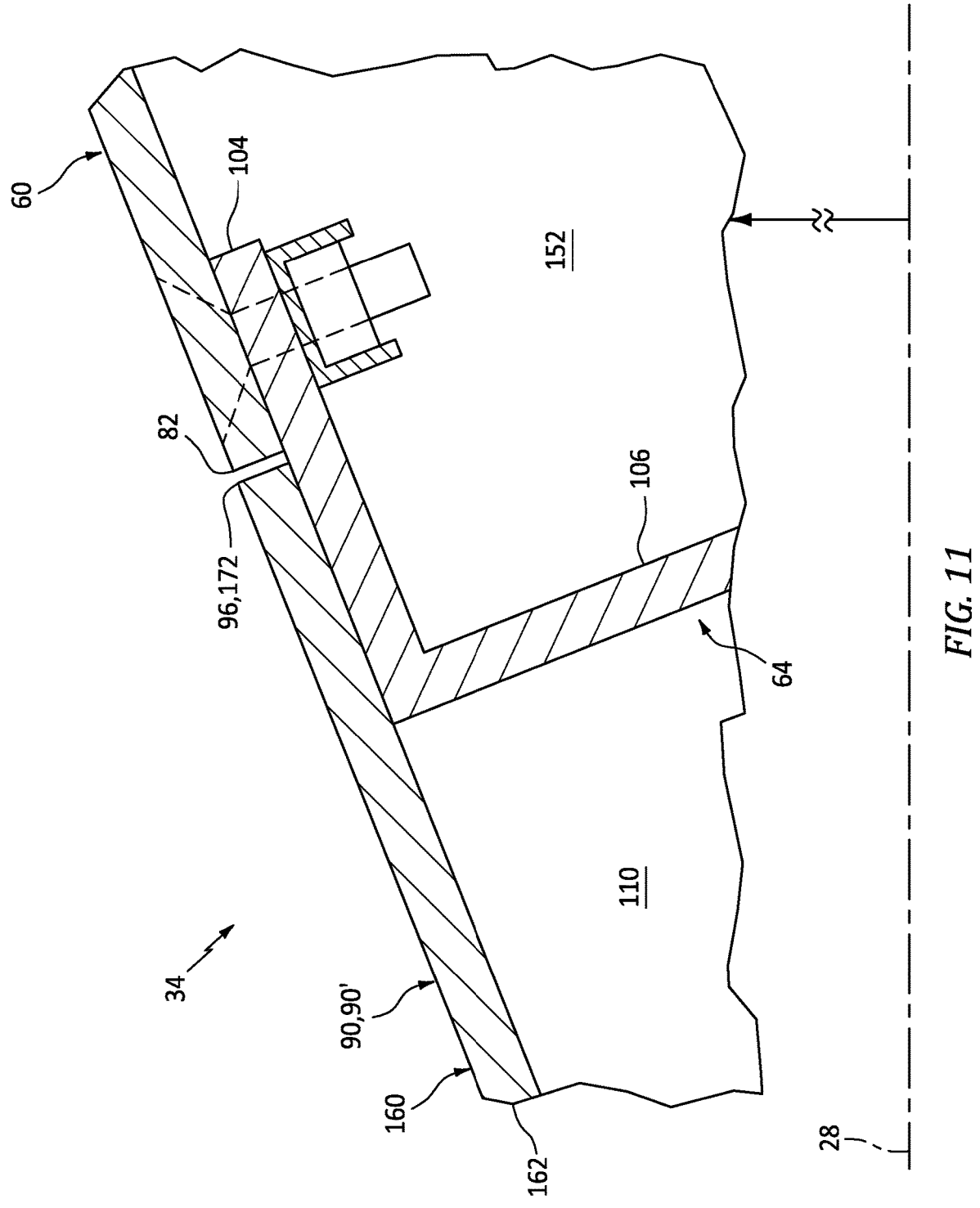
Figure 12:
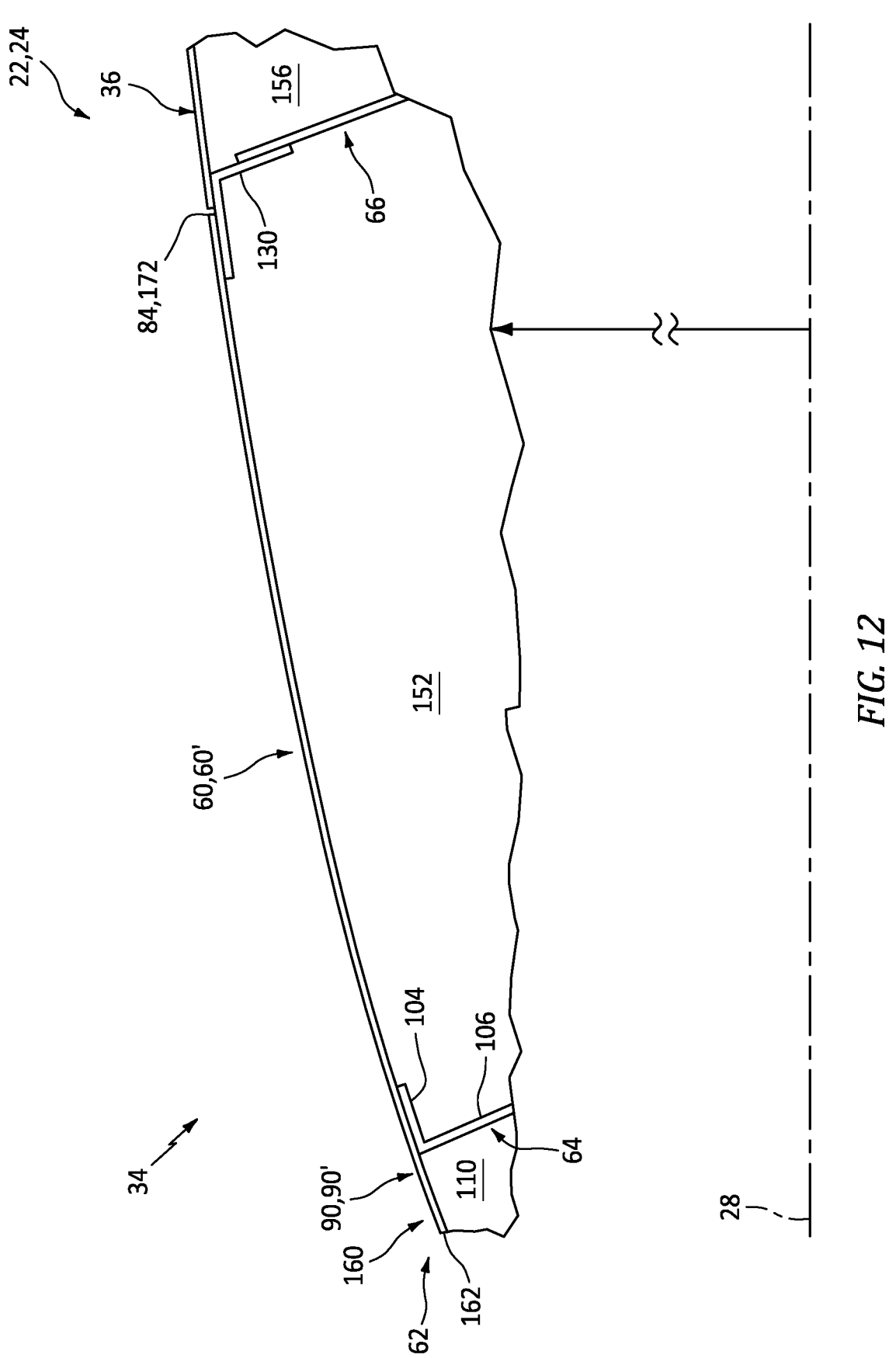
FIG. 12 is a partial sectional illustration of the aircraft propulsion system with an exterior skin forming the inlet lip and the outer barrel.

In another example, referring to FIG. 10, the skin outer end 172 may alternatively be arranged axially adjacent (e.g., abutting or slightly spaced from) the outer barrel forward end 82. Here, each exterior skin 162 and the outer barrel 60 may be discretely mechanically fastened to the forward bulkhead outer flange 104. In another example, referring to FIG. 11, each exterior skin 162 may alternatively be bonded to (e.g., welded to, adhered to, consolidated with, etc.) the forward bulkhead 64 and its forward bulkhead outer flange 104. The outer barrel 60, however, may still be (e.g., removably) mechanically attached to the forward bulkhead 64 and its forward bulkhead outer flange 104. In still another example, referring to FIG. 12, the exterior skin 162 may also form a (e.g., entire) circumferential section of the outer barrel 60. The exterior skin 162 of FIG. 12, for example, also includes an outer barrel section 60'. This outer barrel section 60' forms a (e.g., entire) respective circumferential section of the outer barrel 60. This exterior skin 162 may be bonded, (e.g., removably) mechanically attached or otherwise connected to the forward bulkhead 64.

Figures 13A, 13B:
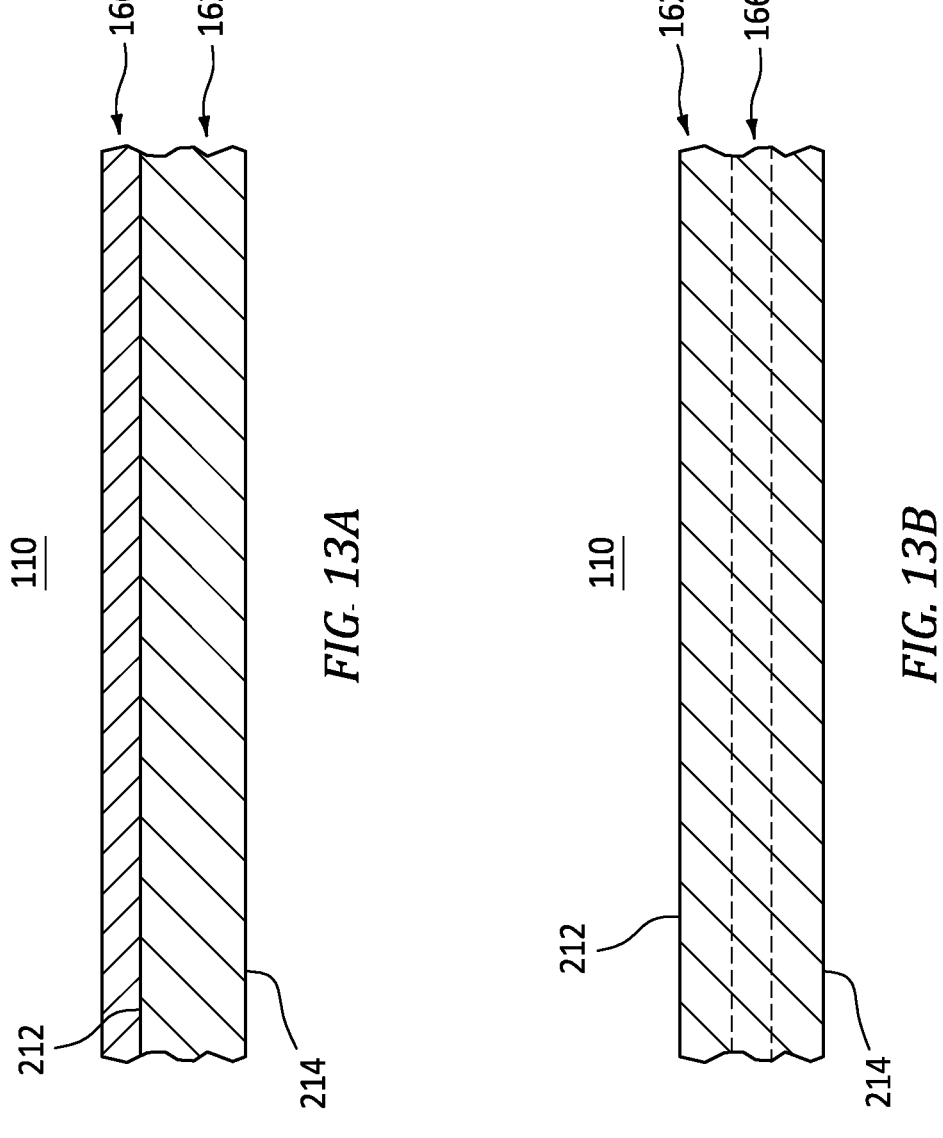
FIGS. 13A and 13B are partial schematic sectional illustrations of various skin-electric heater arrangements.

Referring to FIG. 2, the electric heater 166 is arranged with the exterior skin 162. The electric heater 166 of FIG. 2, for example, may extend longitudinally along at least a portion or an entirety of the inner lip section 88' and/or at least a portion or an entirety of the outer lip section 90'. Each electric heater 166 may extend circumferentially about the axial centerline 28 between and to (or about) the opposing segment sides 168 (see FIG. 5). In some embodiments, referring to FIG. 13A, the electric heater 166 may be disposed within/along the forward cavity 110. The electric heater 166, for example, may be bonded to or otherwise attached to an interior surface 212 of the exterior skin 162. In other embodiments, referring to FIG. 13B, the electric heater 166 may be integrated into the exterior skin 162. The electric heater 166, for example, may be embedded or otherwise incorporated into the exterior skin material and, thus, between the exterior skin interior surface 212 and an exterior surface 214 of the exterior skin 162.

Referring to FIG. 2, the anti-icing system 56 includes the electric heater 166 that is part of/integrated with each structure segment 160. The anti-icing system 56 also includes a controller 216 and an electrical power source 218; e.g., one or more batteries, an electric generator, etc. This anti-icing system 56 is configured to melt and/or prevent ice accumulation on each exterior skin 162 and its exterior surface 214, for example, at, along and near the leading edge 86. The controller 216, for example, may signal the power source 218 (or a switch and/or other regulator between the power source 218 and each electric heater 166) to provide electricity to each electric heater 166. The electricity energizers each electric heater 166 and its heating elements, and each electric heater 166 generates heat energy. The heat energy transfers (e.g., conducts) through the exterior skin material towards (e.g., to) the respective exterior skin exterior surface 214 (e.g., an exterior aerodynamic surface of the inlet structure 34) thereby heating that exterior skin exterior surface 214 to an elevated temperature. This elevated temperature may be selected to be warm enough to melt any ice accumulating on the respective exterior skin exterior surface 214 and/or prevent accumulation of the ice on the respective exterior skin exterior surface 214, while cool enough so as not to damage the respective exterior skin 162 (e.g., when made from the composite material) or any surrounding components and/or needlessly expend energy.

During propulsion system operation, the inlet structure 34 and one or more of its exterior skins 162 may be damaged (e.g., dented, fractured, etc.) when impacted by a foreign object; e.g., a relatively large bird. The inlet structure arrangement of the present disclosure is configured to facilitate relatively easy and/or fast repairs of the inlet structure 34 following such damage. Each damaged exterior skin 162, for example, may be unfastened and individually removed from the inlet structure 34 without requiring, for example, additional removal of adjacent (e.g., undamaged) exterior skins 162. In addition to facilitating relatively easy and/or fast repairs, costs associated with such repairs may also be reduced since only a portion (e.g., one or two of the exterior skins 162) of the inlet structure 34 may need to be repaired/replaced.

Figure 14:
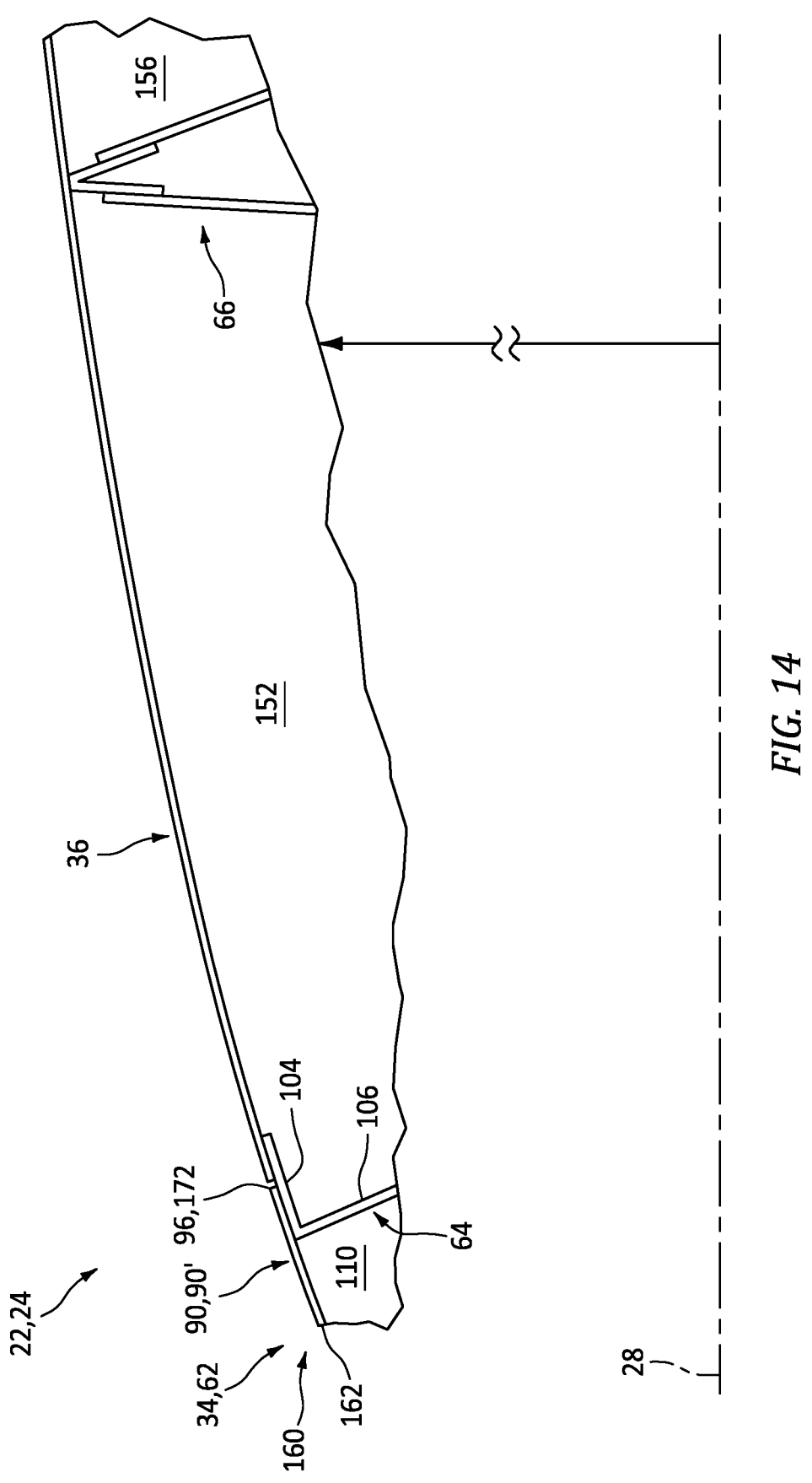
FIG. 14 is a partial sectional illustration of the aircraft propulsion system with another fan cowl arrangement.

In some embodiments, referring to FIG. 14, the inlet structure 34 may be configured without the outer barrel 60 (see FIG. 2). With such an arrangement, each fan cowl 36 may be extended further axially forward along the axial centerline 28. Each fan cowl 36 of FIG. 14, for example, is radially outboard and axially overlaps each of the bulkheads 64 and 66. Each fan cowl 36 of FIG. 14 may thereby radially engage (e.g., contact) and rest against each of the bulkheads 64 and 66. Moreover, while the arrangement of FIG. 14 is described with respect to the anti-icing system 56 with the electric heaters 166, it is contemplated the arrangement of FIG. 14 may alternatively be utilized with a traditional hot air anti-icing system.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. An assembly for an aircraft propulsion system, comprising:

a nacelle inlet structure extending axially along and circumferentially around a centerline, the nacelle inlet structure including an inlet lip, an inner barrel, an outer barrel, a bulkhead and a plurality of structure segments;

the inlet lip forming a leading edge of the nacelle inlet structure;

the inner barrel projecting axially aft away from the inlet lip;

the outer barrel projecting axially aft away from the inlet lip, and the outer barrel radially outboard of and axially overlapping the inner barrel;

each of the plurality of structure segments including an exterior skin, a mount and an electric heater configured to heat the exterior skin;

the bulkhead extending radially between and connected to the mount and the outer barrel, the bulkhead including a bulkhead inner flange, a bulkhead outer flange, and a bulkhead web connected to and extending radially between the bulkhead inner flange and the bulkhead outer flange;

the exterior skin forming a respective circumferential section of the inlet lip; and the mount connected to the exterior skin, the mount including an inner flange, an outer flange and a web connected to and extending radially between the inner flange and the outer flange, the inner flange bonded to the exterior skin, wherein a fastener extends radially through the outer flange and the bulkhead inner flange, and the fastener attaches a respective one of the plurality of structure segments to the inner barrel.

2. The assembly of claim 1, wherein
the inner barrel projects axially aft away from an inner lip portion of the inlet lip;
the outer barrel projects axially aft away from an outer lip portion of the inlet lip;
the mount is radially outboard of and connected to the inner lip portion of the inlet lip.

3. The assembly of claim 2, wherein the bulkhead extends radially between and is connected to the mount and a respective circumferential section of the outer lip portion formed by the exterior skin.

4. The assembly of claim 1, wherein the fastener projects radially inward and partially into a core of the inner barrel.

5. The assembly of claim 1, wherein the fastener extends radially through the mount connected to and projecting axially forward away from a core of the inner barrel.

6. The assembly of claim 1, wherein
the inner flange projects axially forward out from the web; and
the outer flange projects axially aft out from the web and axially overlaps the inner barrel.

7. The assembly of claim 1, wherein
the mount further includes a channel;
the channel projects axially into the mount to the web; and
the channel extends radially within the mount between the inner flange and the outer flange.

8. The assembly of claim 1, further comprising a seal element axially between and engaged with the mount and the inner barrel.

9. An assembly for an aircraft propulsion system, comprising:
a nacelle inlet structure extending axially along and circumferentially around a centerline, the nacelle inlet structure including an inlet lip, an inner barrel, an outer barrel, a first bulkhead and a plurality of structure segments;
the inlet lip forming a leading edge of the nacelle inlet structure;
the inner barrel projecting axially aft away from the inlet lip;
the outer barrel projecting axially aft away from the inlet lip, and the outer barrel radially outboard of and axially overlapping the inner barrel;
each of the plurality of structure segments including an exterior skin, a mount and an electric heater configured to heat the exterior skin;
the first bulkhead extending radially between and connected to the mount and the outer barrel, the first bulkhead including a first bulkhead inner end, a first bulkhead outer end and a bulkhead web connected to and extending radially between the first bulkhead inner end and the first bulkhead outer end, the first bulkhead connected to the inner barrel at the first bulkhead inner end, and the first bulkhead connected to the exterior skin at the first bulkhead outer end;

the exterior skin forming a respective circumferential section of the inlet lip; and the mount connected to the exterior skin, the mount including an inner flange, an outer flange and a web connected to and extending radially between the inner flange and the outer flange, the inner flange bonded to the exterior skin, wherein a fastener extends radially through the outer flange and the first bulkhead inner end, and the fastener attaches a respective one of the plurality of structure segments to the inner barrel.

10. The assembly of claim 9, wherein a second fastener extends radially through the exterior skin and the first bulkhead outer end.

11. The assembly of claim 9, wherein the first bulkhead is bonded to the exterior skin at the first bulkhead outer end.

12. The assembly of claim 9, further comprising:
a second bulkhead extending between a second bulkhead inner end and a second bulkhead outer end;
the second bulkhead connected to the inner barrel at the second bulkhead inner end; and
the second bulkhead connected to a respective circumferential section of the outer barrel formed by the exterior skin at the second bulkhead outer end.

13. The assembly of claim 12, wherein a second fastener extends radially through the exterior skin and the second bulkhead.

14. The assembly of claim 9, wherein the outer barrel is discrete from the exterior skin and mechanically fastened to the first bulkhead at the first bulkhead outer end.

15. The assembly of claim 14, wherein a second fastener extends radially through the exterior skin, the outer barrel and the first bulkhead outer end.

16. An assembly for an aircraft propulsion system, comprising:
a nacelle inlet structure extending axially along and circumferentially around a centerline, the nacelle inlet structure including an inlet lip, an inner barrel, an outer barrel, a first bulkhead and a plurality of structure segments;
the inlet lip including an inner lip portion and an outer lip portion that intersects the inner lip portion at a leading edge of the nacelle inlet structure;
the inner barrel projecting axially aft away from the inner lip portion;
the outer barrel projecting axially aft away from the outer lip portion;
each of the plurality of structure segments including an exterior skin, a mount and an electric heater configured to heat the exterior skin, the electric heater extending longitudinally along an entirety of the inner lip portion and an entirety of the outer lip portion;
the mount including an inner flange, an outer flange and a web connected to and extending radially between the inner flange and the outer flange; and
the exterior skin forming a respective circumferential section of the inner lip portion that is mechanically attached to the inner barrel by the mount and a second fastener, and the exterior skin forming a respective circumferential section of the outer lip portion;

wherein a first fastener extends radially through the outer barrel, the exterior skin and an outer radial end of the first bulkhead, and the first fastener engages a nut of a nut plate attached to an inner side of the outer radial end of the first bulkhead; and wherein the second fastener extends radially through the outer flange and an inner radial end of the first bulkhead, and the second fastener attaches a respective one of the plurality of structure segments to the inner barrel.

17. The assembly of claim 16, further comprising:

a second bulkhead extending between an inner radial end of the second bulkhead and an outer radial end of the second bulkhead;

the second bulkhead connected to the inner barrel at the inner radial end of the second bulkhead; and the second bulkhead connected to a respective circumferential section of the outer barrel formed by the exterior skin at the outer radial end of the second bulkhead.

18. The assembly of claim 17, wherein a third fastener extends radially through the exterior skin and an outer flange of an outer mounting structure the outer radial end of the second bulkhead secured to an aft flange of the outer mounting structure.

* * * * *